(12) United States Patent
Welford (10) Patent No.: US 7,649,920 B2
(45) Date of Patent: Jan. 19, 2010

(54) Q-SWITCHED MICROLASER APPARATUS AND METHOD FOR USE

(75) Inventor: David Welford, Hathorne, MA (US)

(73) Assignees: Topcon Corporation, Tokyo (JP); Voxis, Inc., Point Richmond, CA (US)

(*) Notice: Subject to any disclaimer, the term of this patent is extended or adjusted under 35 U.S.C. 154(b) by 0 days.

(21) Appl. No.: 11/732,513

(22) Filed: Apr. 3, 2007

(65) Prior Publication Data

US 2008/0247425 A1    Oct. 9, 2008

(51) Int. Cl.
    *H01S 3/04* (2006.01)
(52) U.S. Cl. .............. 372/34; 372/36; 372/11; 372/10
(58) Field of Classification Search .......... 372/11, 372/10, 92
    See application file for complete search history.

(56) References Cited

U.S. PATENT DOCUMENTS

| | | | | |
|---|---|---|---|---|
| 5,115,445 | A * | 5/1992 | Mooradian | 372/75 |
| 5,394,413 | A * | 2/1995 | Zayhowski | 372/10 |
| 5,425,039 | A * | 6/1995 | Hsu et al. | 372/6 |
| 5,846,638 | A | 12/1998 | Meissner | |
| 6,101,201 | A * | 8/2000 | Hargis et al. | 372/36 |
| 6,778,563 | B2 * | 8/2004 | Laurell et al. | 372/11 |
| 7,158,546 | B2 * | 1/2007 | Kouta et al. | 372/19 |
| 2003/0214986 | A1 * | 11/2003 | Kouta et al. | 372/39 |
| 2006/0159132 | A1 | 7/2006 | Young et al. | |
| 2006/0238864 | A1 * | 10/2006 | Iida | 359/484 |

FOREIGN PATENT DOCUMENTS

WO   WO 2006/133238 A   12/2006

OTHER PUBLICATIONS

Kafalas, P., et al., "Photosensitive Liquid used as a Nondestructive Passive Q-switch in a Ruby Laser," *J. Appl. Phys.*, 35(8): 2349-2350, (1964).
Karlsson, G., et al., "Diode-pumped Er-Yb:glass laser passively Q switched by use of $Co^{2+}$:$MgAl_2O_4$ as a saturable absorber," *Appl. Optics*, 39,(33): 6188-6192, (2000).
Karlsson, G., et al., "Development and characterization of Yb-Er laser glass for high average power laser diode pumping," *Appl. Phys. B 75*: 41-46 (2002).
McClung, F. J, and Hellwarth, R. W., "Giant Optical Pulsations from Ruby," *J. Appl. Phys.*, 33(3): 828-829 (1962).
Soffer, B. H., "Giant Pulse Laser Operation by a Passive Reversibly Bleachable Absorber," *J. Appl. Phys*, 35: 2251, (1964).

(Continued)

*Primary Examiner*—Minsun Harvey
*Assistant Examiner*—Kinam Park
(74) *Attorney, Agent, or Firm*—Hamilton, Brook, Smith & Reynolds, P.C.

(57) ABSTRACT

A monolithic passively Q switched microlaser includes an optically transparent heat conductive element bonded to a gain medium, which is in turn bonded to a saturable absorber, which may also be bonded to a second optically transparent heat conductive element. Only the gain medium and saturable absorber are disposed within the laser resonator.

25 Claims, 4 Drawing Sheets

OTHER PUBLICATIONS

Sorokin, P. P., et al., "Ruby Laser Q-Switching Elements Using Phthalocyanine Molecules in Solution," *IBM J. Res. Div.*, 8: 182-184 (1964).

Zayhowski, J. J., and Wilson, Jr., A. L., "Pump-Induced Bleaching of the Saturable Absorber in Short-Pulse Nd:YAG/$Cr^{4+}$:YAG Passively Q-Switched Microchip Lasers," *IEEE J. Quant. Electron.* 39(12): 1588-1593 (2003).

Extended Search Report for European Patent Application No. 08075247.0 dated Aug. 5, 2008.

* cited by examiner

Q-SWITCHED MICROLASER APPARATUS AND METHOD FOR USE

BACKGROUND OF THE INVENTION

The process of Q-switching involves the introduction of loss, for example with the use of an absorber or shutter, in a laser oscillator sufficient to prevent lasing while energy is being transferred to a gain medium. When the loss is removed, an intense photon flux builds exponentially from spontaneous emission and the coupling of these photons through a partially reflecting resonator mirror leads to the generation of a Q-switched laser pulse. The first report of short intense pulses of laser light, called giant pulses at the time, was from an actively Q-switched ruby laser [McClung, F. J. and Hellwarth, R. W.: "Giant Optical Pulsations from Ruby," *Journal of Applied Physics* 33 3, 828-829 (1962)]. Shortly thereafter, passive Q-switching using an organic dye as a saturable absorber was reported [P. P. Sorokin, J. J. Luzzi, J. R. Lenkard and G. D. Pettit: "Ruby Laser Q-Switching Elements using Phthalocyanine Molecules in Solution," *IBM J*, vol. 8, pp. 182-184, April, 1964; P. Kafalas, J. I. Masters and E. M. E. Murray: "Photosensitive Liquid used as a Nondestructive Passive Q-Switch in a Ruby Laser," *J. Appl. Phys.*, 35(8), 2349 (1964); and B. H. Soffer: "Giant Pulse Laser Operation by a Passive, Reversibly Bleachable Absorber," *J. Appl. Phys.*, 35, 2551 (1964)].

Over the past forty years a variety of active and passive loss modulation techniques have been used to generate Q-switched laser pulses. These Q-switched laser pulses have been as short as several tens of picoseconds or as long as several hundred nanoseconds, with pulse energies that may range from a small fraction of a microjoule to a significant fraction of a Joule.

In recent years the advent of diode laser pumped solid-state lasers and solid-state saturable absorbers has generated renewed interest in passively Q-switched lasers, including microlasers. In passive Q-switching the laser resonator contains a gain medium and an absorbing medium, both may be saturable and therefore nonlinear in response. As the gain medium is pumped, it may both accumulate stored energy and emit photons. Over many round trips within the laser resonator the photon flux may see gain, fixed loss, and saturable loss in the absorber.

If the gain medium saturates before the absorber, the photon flux may build but the laser will not emit intense pulses. On the other hand if the photon flux builds up to a level that saturates or bleaches the absorber first, the resonator sees a dramatic reduction in intracavity loss and the laser Q-switches, thereby generating a short intense pulse of light.

Figure 1:
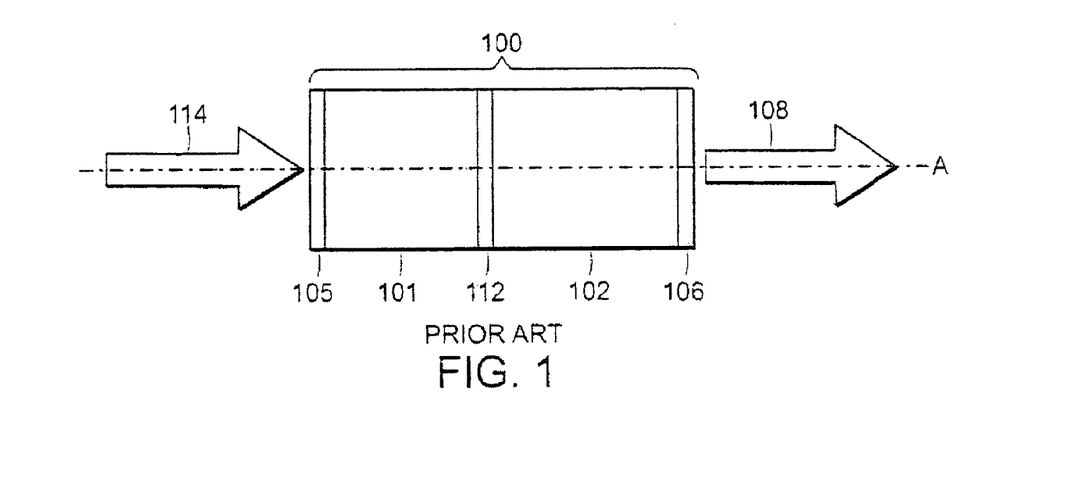
FIG. 1 is a schematic illustrating a Q-switched laser according to the prior art.

A conventional passively Q-switched microlaser 100 is illustrated in FIG. 1. The passively Q-switched microlaser 100 includes a gain medium 101 bonded to a saturable absorber 102 enclosed by a pair of dielectric coatings, 105 and 106, that form a resonant cavity. The dielectric coating 105 on the gain medium transmits the pump light, provided by a light source 114, and is highly reflecting (the high reflector) at the microlaser wavelength. The dielectric coating 106 on the saturable absorber is partially reflecting (the output coupler) at the microlaser wavelength and provides the optical output 108 from the microlaser. The faces of the gain medium 101 and the saturable absorber 102 that form the interface 112 may be coated dielectrically so as to reflect unabsorbed pump light back through the gain medium and transmit light at the microlaser wavelength.

SUMMARY OF THE INVENTION

Passively Q-switched microlasers fabricated using single crystal materials are well established. The single crystal material microlasers may be optically pumped at powers up to several Watts, which may result in the occurrence of optical damage. The optical damage may be in the form of either bulk crystal fracture or optical coating failure as a result of thermally induced stress lowering the coating damage threshold. However, some applications require passively Q-switched microlasers to operate with higher pump powers than is possible in a simple device without improved heat removal.

Heat loads in the gain medium and saturable absorber of the conventional passively Q-switched microlaser are generally removed via conduction through one, or more, of the sides of the device that are not optically active. The lack of more direct heat removal from the optically active pumped face of the gain medium, and to a lesser extent the microlaser output face of the saturable absorber, can limit the maximum average pump power and output power of the device to levels below those desired for some applications. The power limiting mechanism is catastrophic thermal fracture of the materials that constitute the laser because of excessive thermally induced stress.

The problem of thermally induced fracture is worse when using glass materials for the gain medium or saturable absorber. More recently, eye-safe passively Q-switched lasers based on $Yb^{3+}$ and $Er^{3+}$ co-doped phosphate glass have been demonstrated. These eye-safe passively Q-switched lasers are limited to pump powers of only several hundred milliwatts before the gain medium fractures [Karlsson et al.: "Diode-pumped Er-Yb:glass laser passively Q-switched by use of $Co^{2+}:MgAl_2O_4$ as a saturable absorber," *Appl. Optics*, vol. 39, pp. 6188-6192, (2000)]. The pump power limitation is due to the much lower thermal conductivity of the phosphate glass host, $0.85\ Wm^{-1}K^{-1}$, compared to a typical crystalline host, such as YAG, $13\ Wm^{-1}K^{-1}$.

The addition of optically transparent heat conductive elements, or heat spreaders, to the pump and output faces of the microlaser can serve as heat spreaders to directly remove heat from the pumped face of the gain medium and, if required, the microlaser output face of the saturable absorber. The effectiveness of this method has been demonstrated by Zayhowski et al., and reported in "Pump-induced bleaching of the saturable absorber in short-pulse Nd:YAG/$Cr^{4+}$:YAG passively Q-switched microchip lasers," IEEE J. Quant. Electron., vol. 39, pp. 1588-1593 (2003) according to the arrangement shown in FIG. 2. Zayhowski et al. shows passively Q-switched Nd:YAG/Cr:YAG lasers that reliably operate with pump powers as high as 25 W with the use of pieces of undoped YAG bonded to the Nd:YAG. The systems of Zayhowski et al. allows for the removal of heat from the surface in the region of highest density of absorbed pump radiation and its associated heat load. The undoped YAG is bonded to the Nd:YAG in the same manner as the Cr:YAG, which is diffusion bonding as practiced by Meissner at Onyx Optics, Inc. [U.S. Pat. No. 5,846,638]. In the case of a majority of prior art devices, the undoped YAG layer of the microlaser is contained within the laser resonator and therefore adds to its optical length.

Figure 2:
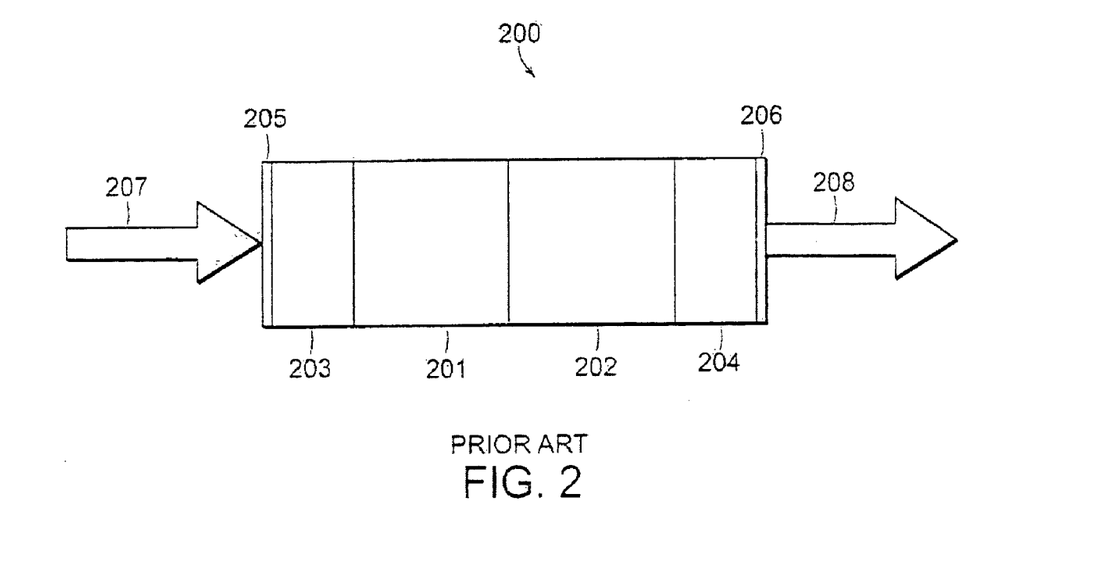
FIG. 2 is a schematic depicting a Q-switched laser with a heat spreader according to the prior art.

The Zayhowski et al. system includes a microlaser 200 comprising a monolithic assembly of a Nd:YAG gain medium 201, a Cr:YAG saturable absorber 202, and two undoped YAG end caps, 203 and 204, all bonded together using diffusion bonding according to U.S. Pat. No. 5,846,638. The two undoped YAG end caps, 203 and 204, were coated dielectrically, with coatings 205 and 206 respectively, to provide the same high reflector and output coupler mirror actions described above and thereby form a resonant optical cavity. Thus, the dielectric coating 205 will transmit the pump light 207 and reflect light at the microlaser wavelength, while the dielectric coating 206 will reflect the pump light and partially reflect light at the microlaser wavelength producing an output beam 208.

It is important to note that the undoped YAG end caps act as heat spreaders and are contained within the microlaser resonator and contribute to its total optical path length. The optical path length determines the microlaser pulse duration. With the addition of the undoped YAG end caps, a significant increase in the total optical path length is achieved, resulting in degradation of the peak power and overall microlaser performance.

Figure 3:
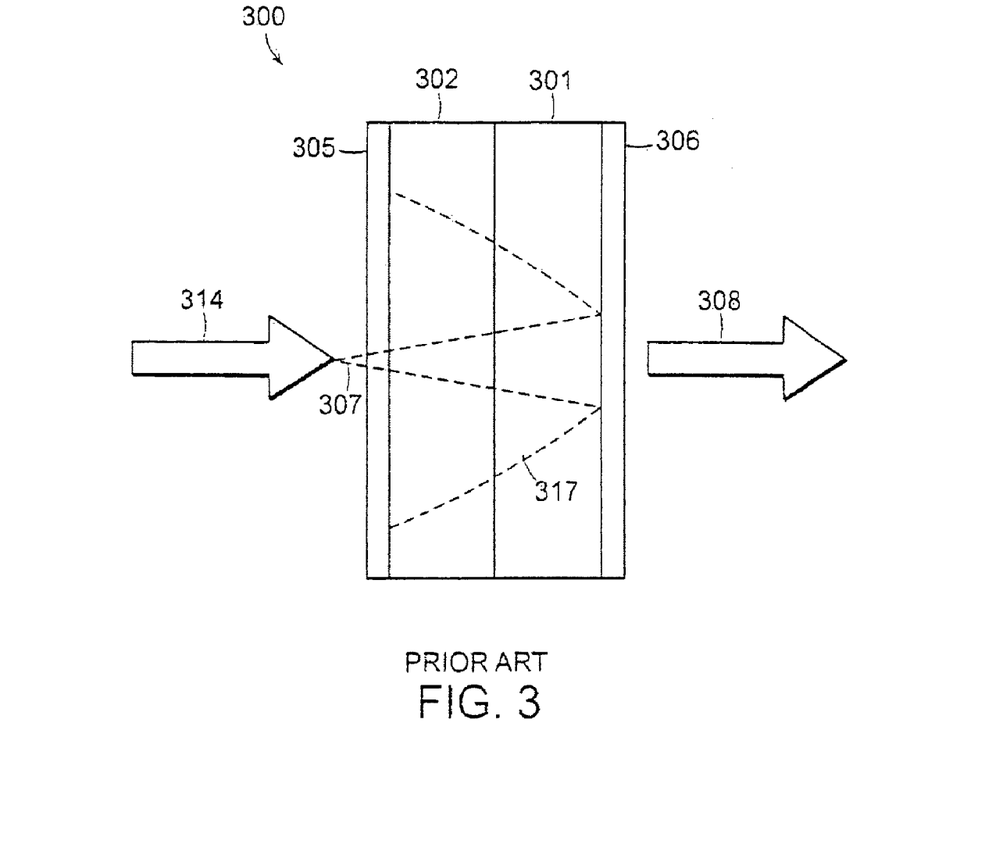
FIG. 3 is another schematic depicting a Q-switched laser with a heat spreader according to the prior art.

Karlsson et al. experienced thermal fracture of a phosphate glass laser host at average pump powers as low as 740 mW. Initially Karlsson et al. attempted to resolve this problem by developing a phosphate laser glass with higher thermal conductivity [Karlsson et al.: "Development and characterization of Yb—Er laser glass for high average power laser diode pumping," *Appl. Phys. B*, vol 75, pp. 41-46 (2002)], but eventually settled on the solution disclosed in Laurell et al., U.S. Pat. No. 6,778,563 (FIG. 3).

As discussed in Laurell et al., in a few unique instances the saturable absorber does not absorb pump light and can serve as an effective heat spreader for the region of highest heat load, namely the pumped surface of the gain medium. FIG. 3 illustrates a passively Q-switched Yb,Er:glass microlaser 300 that includes a gain medium 301 bonded to a saturable absorber 302 enclosed by a pair of dielectric coatings 305 and 306, that form a resonant cavity. The dielectric coating 305 on the saturable absorber 302 transmits the pump light 307 emitted from a diode laser 314 and is highly reflecting (the high reflector) at the microlaser wavelength. The dielectric coating 306 on the gain medium 301 is partially reflecting (the output coupler) at the microlaser wavelength and provides the optical output 308 from the microlaser. The output coupler coating 306 also reflects unabsorbed pump light 307 back through the gain medium 301. Thus, since the saturable absorber 302 does not absorb the pump light 307 but instead transmits the pump light, the absorber acts as a heat spreader to allow for the use of higher pump powers.

It is important to note that, although the saturable absorber 302 acts as a heat spreader, this method has only been applied to this one case because it requires the use of a saturable absorber, in this case Co:spinel, that transmits the pump light. The same method cannot be applied to the widely used Nd:YAG/Cr:YAG passively Q-switched microlaser system because the saturable absorber, Cr:YAG, absorbs pump light as strongly as the gain medium, Nd:YAG.

One of the primary reasons to use a passively Q-switched microlaser is to generate short duration, high-peak power pulses. These pulses may range from several hundred picoseconds to two or three nanoseconds long depending on the choice of gain medium, saturable absorber and resonator physical characteristics. Adding additional length to the resonator of a passively Q-switched microlaser, in the form of an optically transparent element (i.e. providing neither gain nor loss of any type), will always lead to an increase in the Q-switched pulse durations. This increase in Q-switched pulse durations is in direct proportion to the increase in resonator length. For example, Zayhowski et al. have demonstrated several passively Q-switched Nd:YAG/Cr:YAG microlasers with pulse durations in the 200 ps to 300 ps range without undoped YAG end caps that increased to 300 ps to 400 ps when 0.5 mm thick undoped YAG end caps were added.

Most passively Q-switched microlasers employ a gain medium length on the order of one absorption length with regard to the absorption of the pump light. This means that the thermal load at the interface between the saturable absorber and the gain medium is typically 36% of that at the opposite pumped face of the gain medium and is therefore significant. Furthermore, the saturable absorber dissipates heat because of the absorption of laser radiation during the bleaching process. The saturable absorber may also absorb a fraction of the residual pump light exiting the gain medium, for example such is the case of a Cr:YAG saturable absorber in an 808-nm pumped Nd:YAG gain medium. Hence, there may also be significant heat loads that need to be removed from the saturable absorber end of the microlaser.

There is a need for improved removal of heat from passively Q-switched microlasers, without degrading the laser performance. In particular, there is a need for a method of heat removal that does not interfere with the physical properties and arrangement of the gain medium and saturable absorber. The method of heat removal should also be independently configured to obtain the desired laser performance.

Passively Q-switched microlasers require improved heat removal to allow them to be reliably operated at higher average powers, which generally means higher pulse repetition rates, without causing thermal stress induced fracture of the laser gain medium or saturable absorber, which would result in catastrophic failure of the laser.

A reliable method for heat removal from a passively Q-switched monolithic microlaser without significantly impairing its inherent laser performance characteristics is presented. In an embodiment, a passively Q-switched laser apparatus comprises an optically transparent heat conductive element that may be bonded to a gain medium, which in turn may be bonded to a saturable absorber. The saturable absorber may also be bonded to a second optically transparent heat conductive element. Only the gain medium and saturable absorber are disposed within a resonant cavity formed by optical coatings located in the bond interfaces. The gain medium, saturable absorber and laser resonator optical coatings, or mirrors, form a passively Q-switched microlaser, which when longitudinally optically pumped with a suitable source of light will emit high peak power optical pulses. The optically transparent heat conductive element, or elements, serve to efficiently conduct heat from the optical beam path of the microlaser resonator without interfering with the pump light or the microlaser beam paths. In particular, because the optically transparent heat conductive elements lie outside the microlaser resonator they do not add to the resonator optical path length.

An advantage of the embodiment is to allow higher optical pump powers to be used to provide access to a larger range of pulse repetition rates, which is particularly useful in applications that require the collection of many individual single pulse data. For example, in ranging or range imaging applications. Higher pump powers enable the generation of higher pulse repetition rates because the pump energy required to generate a single Q-switched microlaser pulse is essentially fixed and is therefore delivered in a shorter time at higher pump powers.

Another advantage of the embodiment is that the use of a heat spreader arrangement leads to significantly reduced thermal lensing and optical distortion in the gain medium and saturable absorber elements thereby improving the output beam quality of the microlaser, especially at higher pump powers. This characteristic is particularly important when using glass host media because of their relatively poor thermal conductivity.

Another advantage of the embodiment is that the optically transparent heat conductive element may be chosen to specifically transmit either the pump light wavelength or the microlaser output wavelength, while absorbing the other as a means to prevent unwanted pump light from reaching the output beam path or to prevent microlaser pulse energy from reaching and possibly damaging the pump light source, which is typically a semiconductor diode laser.

A passively Q-switched microlaser and method of use is presented. The passively Q-switched microlaser arrangement may comprise a monolithic body including a layer of optically pumped gain medium, a layer of saturable absorber, first and second reflectors arranged to enclose the gain medium and the saturable absorber in order to form a resonant cavity having an optical axis, a heat spreader of optically transparent material on the optic axis outside of the resonate cavity, and an optical pump beam at a wavelength absorbed by the gain medium arranged for longitudinal pumping of said laser resonator.

The gain medium active ion may be $Nd^{3+}$, $Er^{3+}$, $Ho^{3+}$, $Tm^{3+}$, $Yb^{3+}$, or a combination thereof. The gain medium may also be comprised of a single crystal host material that is a member of the garnet, fluoride, orthovanadate, tungstate, or oxyborate families. The gain medium host material may also be a phosphate glass, a silicate glass, or an optical ceramic, such as ceramic YAG. The gain medium may be Nd:YAG or Yb,Er co-doped phosphate glass.

The saturable absorber active ion may be $Cr^{4+}$ or $Co^{2+}$. The saturable absorber may comprise a host material which is a single crystal material that may be a member of the garnet, fluoride, orthovanadate, tungstate, or oxyborate families. The saturable absorber host material may also be a phosphate glass, a silicate glass, or an optical ceramic, such as ceramic YAG. The saturable absorber may also be Cr:YAG or Co:spinel.

The heat spreader may be a single crystal material that is a member of the garnet, fluoride, orthovanadate, tungstate, or oxyborate families. The heat spreader may also be sapphire or Co:spinel. The heat spreader may be configured to transmit light at the pump laser wavelength and absorb light at the microlaser wavelength or vice-versa. The heat spreader may also be configured to remove heat from an optically pumped surface. The microlaser may also comprise two heat spreaders, the second heat spreader being located on the optical axis and outside of the resonant cavity, with the heat spreader and second heat spreader being on opposite ends of the resonant cavity.

The first and second reflectors may be dielectric coatings applied directly to the gain medium and saturable absorber, respectively. The first and second reflectors may also be mirrors attached to the gain medium and saturable absorber by adhesives or bonding techniques. The first reflector may be configured to transmit light at the pump laser wavelength and reflect light at the microlaser wavelength. The second reflector may be configured to reflect light at the pump laser wavelength and partially transmit light at the microlaser wavelength.

The gain medium, saturable absorber and heat spreader material may use a common host crystal. The common host crystal may be a single crystal material that is a member of the garnet, fluoride, orthovanadate, tungstate or oxyborate families.

These and other features and advantages of the embodiments presented will be apparent from the following more detailed description of the preferred embodiments, taken in conjunction with the accompanying drawings, which illustrate by way of example, the principles of the invention.

BRIEF DESCRIPTION OF THE DRAWINGS

The following description of preferred embodiments of the present invention are best understood when read in conjunction with the accompanying drawings of prior art and arrangements of the present invention. In the preferred embodiment drawings like reference characters refer to the same parts throughout. The drawings are not necessarily to scale, emphasis instead being placed upon illustrating the principles of the invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

An apparatus and method for heat removal from a passively Q-switched monolithic microlaser without significantly impairing its inherent laser performance characteristics is presented. The apparatus may comprise an optically transparent heat conductive element that may be bonded to a gain medium, which in turn may be bonded to a saturable absorber. The saturable absorber may also be bonded to a second optically transparent heat conductive element. Only the gain medium and saturable absorber are disposed within a resonant cavity formed by optical coatings located in the bond interfaces.

The optically transparent heat conductive element, or elements, serve to efficiently conduct heat from the optical beam path of the microlaser resonator without interfering with the pump light or the microlaser beam paths. In particular, because the optically transparent heat conductive elements lie outside the microlaser resonator they do not add to the resonator optical path length. The methods and apparatus presented herein provide a low cost and easily manufactured solution to heat removal in passively Q-switched microlasers. The methods and apparatus presented herein also allow for higher pumping powers resulting in higher pulse repetition rates without increasing the duration of the pulse.

In the context of the embodiments presented the expression "optically transparent" refers to an optical element that provides minimal or no optical gain and no significant loss at the wavelength of the light being intentionally transmitted. The light being transmitted will be at either the pump light wavelength or microlaser output wavelength, or both, depending on the location of the element. The element does not need to be optically transparent at other less significant wavelengths. The expressions "heat spreader" and "optically transparent heat conductive element" may be used interchangeably within the context of describing the present invention.

Figure 4:
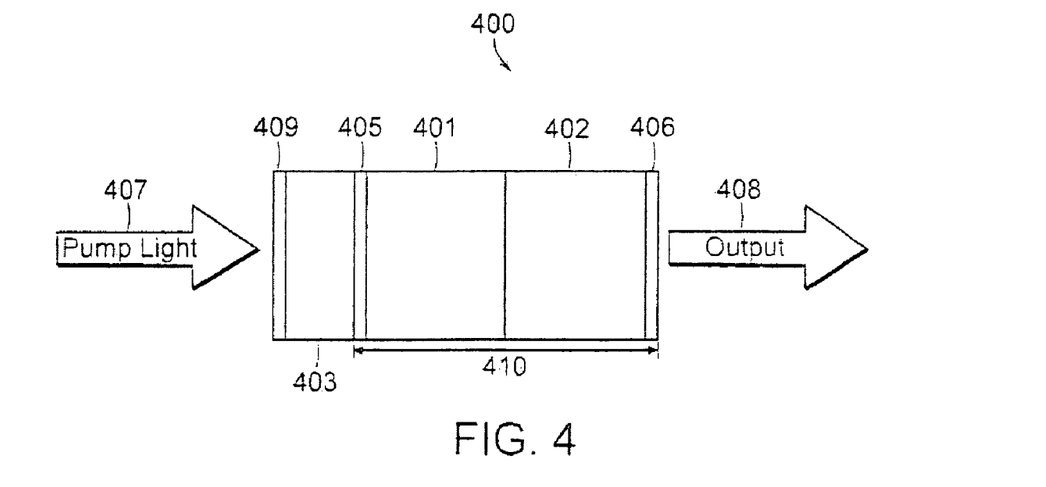
FIG. 4 shows a schematic representation of a passively Q-switched microlaser according to an embodiment of the present invention.

FIG. 4 schematically illustrates a passively Q-switched microlaser 400 according to an embodiment of the present invention. The passively Q-switched microlaser 400 comprises a gain medium 401 bonded to a saturable absorber 402 enclosed by a pair of dielectric coatings, 405 and 406, that form a resonant cavity defined by a length 410. The dielectric coating 405 on the gain medium 401 transmits the pump light 407 and is highly reflecting (the high reflector) at the microlaser wavelength. The dielectric coating 406 on the saturable absorber 402 is partially reflecting (the output coupler) at the microlaser wavelength and provides an optical output 408 from the microlaser 400. The output coupler coating 406 may also reflect unabsorbed pump light 407 back though the gain medium 401. An optically transparent heat conductive element 403 is bonded to the gain medium 401 and its exposed face dielectrically coated 409. It is important to note that the dielectric coating 409 on the optically transparent heat conductive element 403 plays no role in formation of the microlaser resonant optical cavity, and does not add to the resonator optical length 410. Therefore, the optically transparent heat conductive element 403 does not influence the performance of the microlaser 400, for example, by altering the duration of the pulses.

Once the pump light has been transmitted through the optically transparent heat conductive element 403, the transmitted light will then pass through the gain medium 401, thus causing an excitation of ions and energy to be stored within the gain medium 401. As the energy stored within the gain medium 401 increases and the intracavity intensity at the microlaser wavelength also increases, the absorber 402 will become saturated causing a reduction in resonator loss and a rapid further increase in intensity and the extraction of a significant fraction of the stored energy as the microlaser output pulse. After the pulse is emitted, the absorber 402 may recover to its high-loss state before the gain medium 401 recovers, so that the next pulse is delayed until the stored energy in the gain medium 401 is fully replenished. Thus, the physical properties of the saturable absorber and gain medium largely determine the repetitive nature of the Q-switched pulse generation when the pump light is continuous.

The optically transparent heat conductive element 403 brings many advantageous features to the microlaser 400, one of which is to act as a heat spreader. Heat removal from the gain medium via direct conduction through the heat spreader significantly reduces the peak temperature, temperature gradients and thermally induced stress in the gain medium 401. For example, consider that a finite element thermal model of the arrangement 500 shown in FIG. 5 for a 1 W heat load in a 1-mm thick Yb,Er:glass gain medium 501, sandwiched between a 0.15-mm thick Co:spinel saturable absorber 502, and a 0.5-mm thick Co:spinel heat spreader 503; showed a reduction in the peak temperature at the pumped surface 520 of the gain medium 501 from 560° C. without the heat spreader 503 to 120° C. with the heat spreader 503. Similar to the microlaser of FIG. 4, the microlaser 500 also comprises dielectric coatings 505 and 506 defining the limits of the resonator optical length 510. The optically transparent heat conductive element 503 also comprises a dielectric coating 509. The microlaser 500 is adapted to receive a pump light 507 and emit an output light beam 508.

Figure 5:
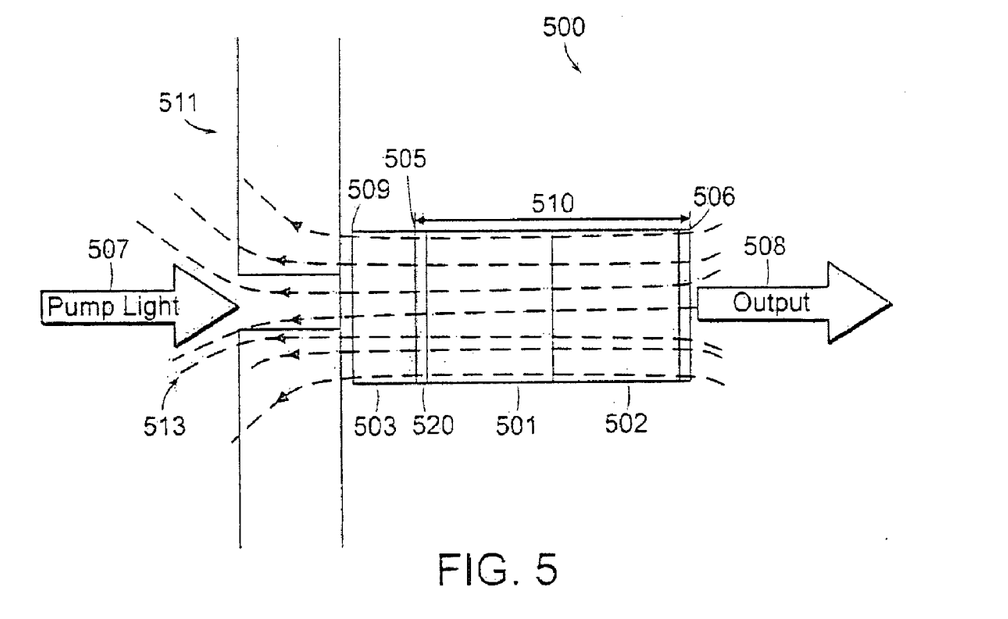
FIG. 5 shows an illustration of a microlaser, according to an embodiment of the present invention, attached to an aluminum heat sink.

The absorption of pump light 507 in the gain medium 501 may result in a significant rise in temperature of the pumped surface 520. The heat spreader 503 may be used to remove the heat from the pumped surface 520, thereby reducing its temperature as represented by heat flux lines 513. Once the flux lines 513 reach the heat spreader 503, they diverge representing a decrease in temperature due to a spreading of heat. An aluminum plate 511 held at 25° C. is used as a heat sink, thus all the dispersed heat 513 will be transferred to the aluminum plate 511. The heat load in the gain medium 501 was confined to a 100 µm diameter region typical of the pumped region cross-sectional area of a longitudinally pumped microlaser.

Figure 7:
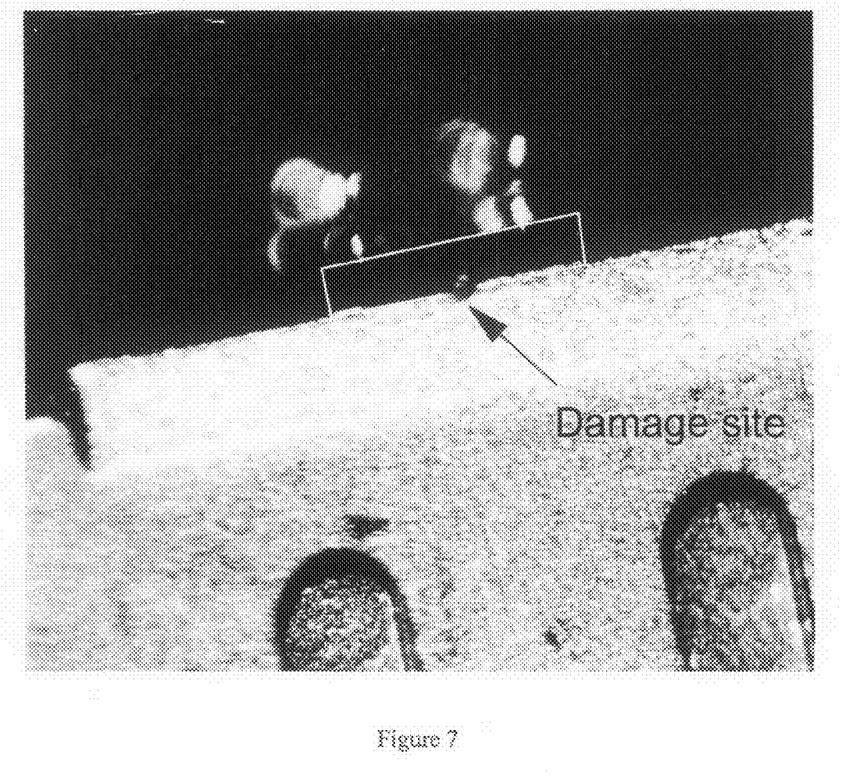
FIG. 7 shows an example of optical damage to a semiconductor diode laser used to optically pump a passively Q-switched Yb,Er:glass microlaser that was caused by microlaser pulse energy emitted via the microlaser resonator high reflector.

The optically transparent heat conductive element 403 may also, protect the source of the pump light. The semiconductor diode laser pump source used with a passively Q-switched microlaser may in some instances be optically damaged by microlaser pulse energy that is transmitted via the microlaser resonator high reflector. For example FIG. 7 shows a microscope photograph of a 975 nm single emitter diode laser that ceased to emit after being used to optically pump a passively Q-switched Yb,Er:glass microlaser. The center of the device facet that is outlined by a rectangle has a circular pit, or damage site, located in the emitting region. This damage site is a result of material ablation by several thousand 1.5 µm, 1 µJ to 2 µJ laser pulses. Normally one expects that very little if any laser pulse energy would be emitted via the high reflector of the microlaser. However, the output coupler transmission is typically only 1% for a Yb,Er:glass passively Q-switched microlaser and such a microlaser generating 10 µJ to 20 µJ output pulse energies with even a 99.9% reflectivity high reflector would leak sufficient pulsed energy to be problematic.

The optically transparent heat conductive element 403 may be used to prevent microlaser pulse energy leakage via the high reflector by one of two methods or a combination of the two. The first method is by designing the dielectric coating 409 on the exposed surface of the heat spreader 403 to be highly reflective at the microlaser wavelength. This method has the potential for the formation of an optical etalon between the dielectric coatings on the heat spreader 403 and the gain medium 401, which can be eliminated by wedging the heat spreader.

For example, a sapphire heat spreader was bonded with a thin layer of UV-cure optical adhesive to the pumped face of the passively Q-switched microlaser that caused the damage shown in the FIG. 7. The exposed surface of the sapphire heat spreader was dielectrically coated to be highly reflective at the microlaser wavelength. This laser was then operated for many hours over a period of several weeks with a replacement semiconductor diode laser as the pump source without subsequent failure of, or damage to, the diode laser.

The second method is by use of a heat spreader 403 that is absorbing at the microlaser wavelength and transmitting at the pump wavelength, which in the case of the Yb,Er:glass laser example could be the saturable absorber, Co:spinel. The bonding method used to attach the different elements of the microlaser to one another need to be compatible with the materials used. Particular attention should be paid to mismatches in the coefficient of thermal expansion and melting point to ensure the formation of strong, low optical loss and stress free interfaces. Bonding methods that may be used include, but are not limited to, optical contacting, adhesive bonding, diffusion bonding, fusion bonding, wringing, frit bonding, and chemically assisted direct bonding. Many bonding methods introduce no material, or very little material, between the components being bonded and therefore do not significantly contribute to thermal resistance.

Many factors should be considered when making an appropriate selection of material for the heat spreader, bonding method and dielectric coating characteristics. In general the heat spreader will have the same, or larger, cross-sectional area as the gain medium surface of the microlaser and will typically be between 0.1 mm and 10.0 mm thick. Thinner heat spreaders are difficult to fabricate and do not effectively remove heat, while thicker heat spreaders are no more effective than those that fall in the stated thickness range.

Single crystal materials offer higher thermal conductivities than glasses or plastics when considered for use as a heat spreader. Considering the visible through near-infrared spectral regions, that are most likely to contain the pump and microlaser wavelengths, the commonly used optically transparent materials and their thermal conductivities given in Table 1 illustrate the superiority of single crystal materials for use as heat spreaders. In rare cases the use of a glass material may be required for fabrication reasons and would be better than no heat spreader. Plastics and organic materials are generally of no use as heat spreaders, but may be successfully used in very thin layers as bonding adhesives.

TABLE 1

Thermal conductivities of commonly used optically transparent materials including laser gain media host crystals and glasses.

| Material | $k\ (Wm^{-1}K^{-1})$ |
| --- | --- |
| BK-7 glass | 1.1 |
| GGG | 7.4 |
| GSGG | 4.9 |
| Kigre QX phosphate glass | 0.85 |
| Kigre Q-246 silicate glass | 1.3 |
| KGW | 2.2-3.5 |
| LiCaF | 4.6-5.1 |
| LNA, LMA | 2.7-4.6 |
| LSB | 12.3 |
| Quartz | 1.5 |
| Sapphire | 28 |
| YAG | 13 |
| YALO | 11 |
| YLF | 4.3 |
| YOS | 4.5 |
| YSAG | 10.8 |
| YSGG | 7.9 |
| $YVO_4$ | 5.2 |

Preferred heat spreader materials are sapphire and undoped YAG because of their widespread availability. YAG is particularly useful as a heat spreading material because it is also widely used as the host material for many laser gain media (Nd:YAG, Yb:YAG, Tm:YAG, Ho:YAG, Er:YAG, Ho,Tm:YAG) and the most widely used 1-micron saturable absorber, Cr:YAG. However, this preference does not preclude the use of any other suitable materials should they become available.

Figure 6:
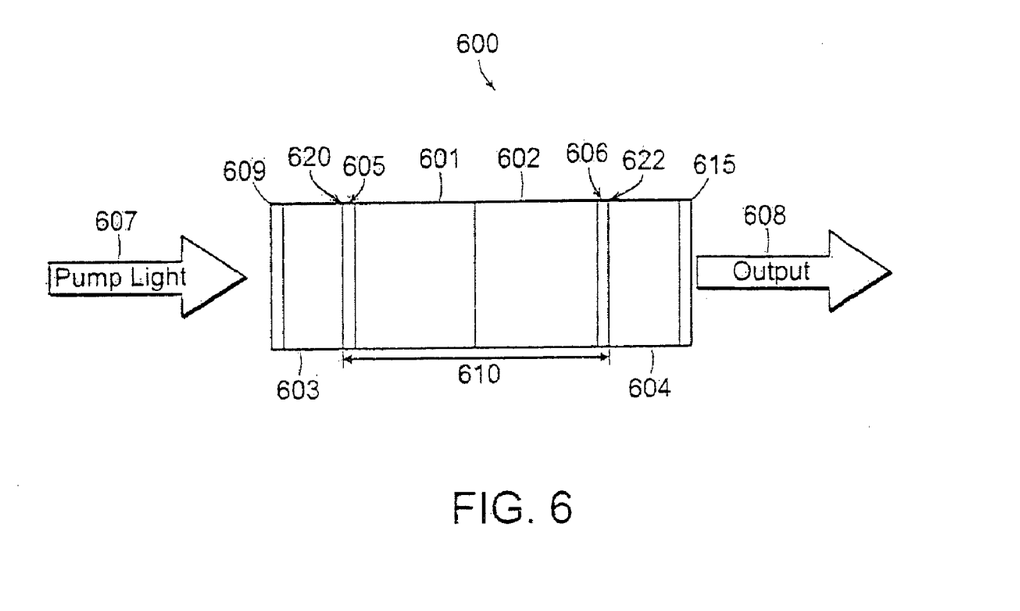
FIG. 6 shows a schematic representation of a passively Q-switched microlaser according to an embodiment of the present invention.

FIG. 6 schematically illustrates an alternative design for a passively Q-switched microlaser 600 according to an embodiment of the present invention. The microlaser 600 comprises a gain medium 601 bonded to a saturable absorber 602 enclosed by a pair of dielectric coatings, 605 and 606, that form a resonant cavity defined by an optical length 610. The dielectric coating 605, on the gain medium 601, transmits the pump light 607 and is highly reflecting (the high reflector) at the microlaser wavelength. The dielectric coating 606 on the saturable absorber 602 is partially reflecting (the output coupler) at the microlaser wavelength and provides the optical output beam 608 from the microlaser 600. The output coupler coating 606 may also reflect unabsorbed pump light back though the gain medium 601.

A first optically transparent heat conductive element 603 is bonded to the gain medium 601 and the exposed face dielectrically coated 609, in a similar manner to that of the microlaser 400 of FIG. 4. In a similar manner to the optically transparent heat conductive element 403 of FIG. 4, the optically transparent heat conductive element 603 also acts as a heat spreader, thus reducing the temperature at the pump surface 620 and preventing thermal stress induced fracture of the gain medium 601 or optical damage to the dielectric coating 605, which would result in catastrophic failure of the microlaser 600.

The first optically transparent heat conductive element 603 may be highly transmissive at the pump light wavelength and absorbing at the microlaser wavelength, thus preventing the microlaser pulse energy from reaching the pump light source and potentially causing damage. Additional protection may be provided for the pump source by making the dielectric coating 609 highly reflecting at the microlaser wavelength.

A second optically transparent heat conductive element 604 may be bonded to the saturable absorber 602 and the exposed face dielectrically coated 615. The second optically transparent heat conductive element 604 may also act as a heat spreader and reduce the temperature at the surface 622 of the saturable absorber 602. The primary method of heat removal from the saturable absorber via direct conduction through the second heat spreader 604 is the same as described for the first heat spreader and is equally effective in reducing the peak temperature, temperature gradients and thermally induced stress.

The second optically transparent heat conductive element 604 may also be used to prevent unabsorbed pump light 607 exiting the microlaser via the output coupler 606 with the intended output beam 608, which is undesirable, by the same techniques of reflection and absorption described as a means to prevent microlaser pulse energy from reaching the pump source 607. The dielectric coating 615 on the exposed surface of the second heat spreader 604 may be highly reflecting at the pump light wavelength, which removes the pump light 607 from the output beam 608 of the microlaser with the advantage that more pump light 607 is deposited in the gain medium 601 because of the second pass. Unabsorbed pump light may be also be attenuated by use of a heat spreader 604 that is absorbing at the pump light wavelength and transmitting at the microlaser wavelength, which in the case of the Yb,Er: glass laser example could be Yb:YAG.

It is important to note that the dielectric coatings on the optically transparent heat conductive elements, 609 and 615, play no role in the formation of the microlaser resonant optical cavity and do not add to its optical length 610.

The second heat spreader 604 may be the same material as the first heat spreader 603 or may be a different material so long as it is sized and configured to effectively remove heat. In general the second heat spreader 604 will have the same or larger cross-sectional area as the saturable absorber face 622 of the microlaser and will typically be between 0.1 mm and 10.0 mm thick. Thinner heat spreaders are difficult to fabricate and do not effectively remove heat, while thicker heat spreaders are no more effective than those that fall in the stated thickness range.

The passively Q-switched microlasers, shown in FIGS. 4 and 6, may use longitudinal optical pumping that may require high beam intensities in sub-millimeter diameter beams and spectral widths of several nanometers that are comparable to and overlap the absorption features of the gain medium. These requirements may be best met with a semiconductor diode laser, or lasers. The light from said semiconductor diode laser, or lasers, may be coupled to the microlaser gain medium in a variety of ways that may include, but are not limited to, direct butt-coupling, lens imaging and optical fiber-coupled delivery methods.

While this invention has been particularly shown and described with references to preferred embodiments thereof, it will be understood by those skilled in the art that various changes in form and detail may be made therein without departing from the spirit and scope of the invention as defined in the appended claims. For example the gain medium and saturable absorber may be configured in any order (i.e., the saturable absorber may be closest to the pump laser). In addition, a single heat spreader may be fabricated on the output end of the microlaser.

What is claimed is:

1. A microlaser arrangement comprising a monolithic body including:
   a layer of optically pumped gain medium;
   a layer of saturable absorber;
   first and second reflectors arranged to enclose the gain medium and the saturable absorber in order to form a resonant cavity having an optical axis;
   a pump beam at a pump laser wavelength applied through an input of the resonant cavity and absorbed by the gain medium to produce a laser beam at a microlaser wavelength from an output of the resonant cavity; and
   a first heat spreader capable of selectively absorbing optical beams on the optic axis outside of the resonant cavity, the heat spreader coupled to the output of the resonant cavity and configured to substantially absorb the pump beam or the heat spreader coupled to the input of the resonant cavity and configured to substantially absorb the laser beam.

2. The microlaser of claim 1 wherein the gain medium active ion is $Nd^{3+}$, $Er^{3+}$, $Ho^{3+}$, $Tm^{3+}$, $Yb^{3+}$, or a combination thereof.

3. The microlaser of claim 1 wherein the gain medium host material is a single crystal material that is a member of the garnet, fluoride, orthovanadate, tungstate, or oxyborate families.

4. The microlaser of claim 1 wherein the gain medium host material is a phosphate glass or a silicate glass.

5. The microlaser of claim 1 wherein the gain medium host material is an optical ceramic, such as ceramic YAG, 6. The microlaser of claim 1 wherein the gain medium is Nd:YAG.

7. The microlaser of claim 1 wherein the gain medium is Yb,Er co-doped phosphate glass.

8. The microlaser of claim 1 wherein the saturable absorber active ion is $Cr^{4+}$ or $Co^{2+}$.

9. The microlaser of claim 1 wherein the saturable absorber host material is a single crystal material that is a member of the garnet, fluoride, orthovanadate, tungstate or oxyborate families.

10. The microlaser of claim 1 wherein the saturable absorber host material is a phosphate glass or a silicate glass.

11. The microlaser of claim 1 wherein the saturable absorber host material is an optical ceramic, such as ceramic YAG.

12. The microlaser of claim 1 wherein the saturable absorber is Cr:YAG.

13. The microlaser of claim 1 wherein the saturable absorber is Co:spinel.

14. The microlaser of claim 1 wherein the heat spreader is a single crystal host material that is a member of the garnet, fluoride, orthovanadate, tungstate or oxyborate families.

15. The microlaser of claim 1 wherein the gain medium, saturable absorber and heat spreader use a common host crystal.

16. The microlaser of claim 15 wherein the host crystal is a single crystal material that is a member of the garnet, fluoride, orthovanadate, tungstate or oxyborate families.

17. The microlaser of claim 1 wherein the heat spreader is transmitting at a pump laser wavelength and absorbing at a microlaser wavelength.

18. The microlaser of claim 17 wherein the heat spreader is Co:spinel.

19. The microlaser of claim 1 wherein the first and second reflectors are dielectric coatings applied directly to the gain medium and saturable absorber, respectively.

20. The microlaser of claim 19 wherein the first reflector is highly transmitting at a pump laser wavelength and highly reflecting at a microlaser wavelength.

21. The microlaser of claim 19 wherein the second reflector comprises low transmission at pump laser wavelength and partial transmission at a microlaser wavelength.

22. The microlaser of claim 19 wherein the heat spreader is bonded to the first reflector and is transmitting at a pump laser wavelength and absorbing at a microlaser wavelength.

23. The microlaser of claim 1 wherein the heat spreader removes heat from an optically pumped surface.

24. The microlaser of claim 19 wherein the heat spreader is bonded to the second reflector, and comprises low transmission at a pump laser wavelength.

25. The microlaser of claim 1 wherein the first heat spreader is bonded to the first reflector, the heat spreader absorbing at a microlaser wavelength, and a second heat spreader is bonded to the second reflector, the second heat spreader absorbing at a pump laser wavelength.

* * * * *